June 13, 1939.　　　C. A. SAWTELLE　　　2,161,903
BRAKE MECHANISM
Filed June 15, 1936　　　2 Sheets-Sheet 1

INVENTOR
CHARLES A. SAWTELLE
BY
ATTORNEYS

June 13, 1939.  C. A. SAWTELLE  2,161,903
BRAKE MECHANISM
Filed June 15, 1936   2 Sheets-Sheet 2

INVENTOR
CHARLES A. SAWTELLE
BY
ATTORNEYS

Patented June 13, 1939

2,161,903

UNITED STATES PATENT OFFICE 2,161,903

BRAKE MECHANISM

Charles A. Sawtelle, Detroit, Mich., assignor to Kelsey-Hayes Wheel Company, Detroit, Mich., a corporation of Delaware Application June 15, 1936, Serial No. 85,395

3 Claims. (Cl. 188—78)

This invention relates generally to brake mechanism and refers more particularly to an improved shoe brake.

One of the principal objects of this invention is to provide an actuator between the spaced ends of the friction means at one side of the drum constructed to effect a more uniform engagement of the friction means with the brake flange of the drum. In accordance with this invention, the above result is accomplished by imparting a lateral force to the aforesaid ends of the friction means in such a manner as to effect angular force components in the direction of the anchor adjustment device located between the opposite ends of the friction means.

Another advantageous feature of the present invention resides in the provision of an anchor adjustment device between the spaced ends aforesaid of the friction means, and constructed to impart angular force components to the friction means in the direction of the actuator in dependence upon applying a lateral force to the ends of the friction means by the adjustment means. This feature is advantageous in that it renders it possible to secure a uniform adjustment of the entire braking surface area of the friction means with respect to the adjacent surface of the brake flange.

Another object of the present invention consists in the provision of a brake embodying interchangeable shoes having spaced ends for receiving therebetween, a suitable actuator and an adjustment anchor device.

A further feature of the present invention is to provide a two shoe brake of the above character wherein the shoes are not only interchangeable from one side of the axis of the brake drum to the other, but are also interchangeable end for end without interfering with either the adjustment anchor device or the brake actuator. The advantage of this construction will be readily understood when it is considered that the primary shoe wears at a much faster rate than the secondary shoe and consequently, interchanging these two shoes after a reasonable interval of service will have the effect of appreciably increasing the life of the brake linings. Also, in many brakes of the shoe type, the ends of the shoes at one side of the drum wear to a greater extent than the other ends and this wear may, in effect, be compensated for by interchanging the shoes end for end. In addition, the foregoing construction is advantageous in that it materially simplifies assembly and offers the possibility of appreciably reducing inventory.

The foregoing, as well as other objects, will be made more apparent as this description proceeds, especially when considered in connection with the accompanying drawings, wherein.

Figure 1:
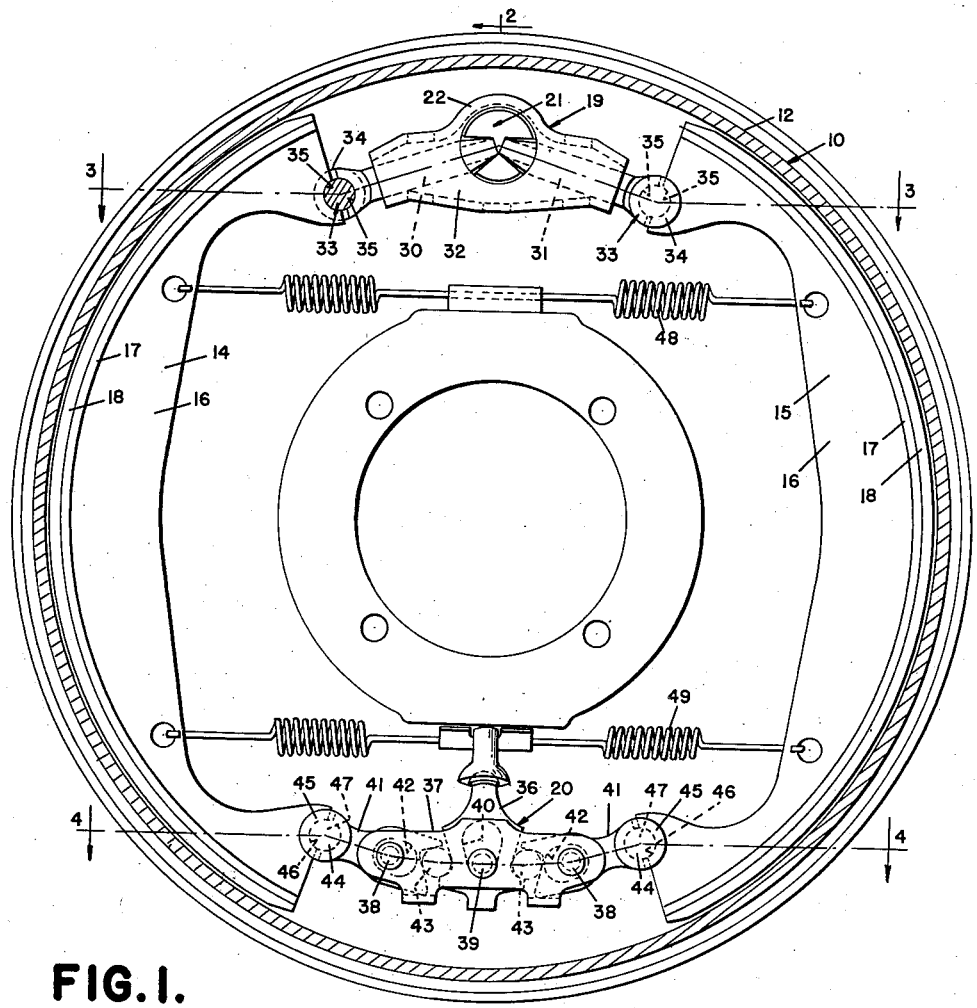
Figure 1 is a side elevational view of a brake constructed in accordance with this invention and having certain parts broken away for the sake of clearness.

Referring now more in detail to the drawings, it will be noted that the reference character 10 indicates a brake drum having a web 11 and having an annular brake flange 12 extending axially from the periphery of the web 11. Upon reference to Figure 2, it will be noted that the drum is closed by a backing plate 13 fixed against rotation relative to the drum 10 and forming a support for the brake shoe disposed within the drum.

In the illustrative embodiment of the invention, the brake is shown as comprising two brake shoes disposed on opposite sides of a plane including the axis of rotation of the drum and designated herein by the reference characters 14 and 15. The brake shoes are preferably of substantially T-shape cross section having a web or stem portion 16 located within the plane of rotation of the drum and having an axially extending head portion 17 provided with a brake friction material 18 for engaging the inner annular surface of the brake flange 12.

Referring again to Figure 1 of the drawings, it will be noted that the ends of the shoes are spaced from each other to respectively receive therebetween, an adjustment anchor device 19 and an actuator 20. For the purpose of convenience in describing the invention, it will be assumed that the adjustment anchor device 19 is located between the upper ends of the shoes and that the actuator 20 is positioned between the lower ends of the shoes. The adjustment anchor device comprises an axially movable cylindrical member 21 supported within a tubular portion 22 of the backing plate 13 and having notches 23 upon the outer end thereof for engagement with corresponding projections 24 on the inner end of the adjusting screw 25. The adjusting screw 25 is threadedly mounted in a tubular member 26 having an enlarged portion 28 at the inner end thereof arranged in axial alignment with the tubular portion 22 on the backing plate and permanently secured to the latter portion. As will be observed from Figure 2, the opposite sides of the cylindrical member 21 are provided with grooves 29 diverging from the outer ends thereof toward the axis of the cylindrical member 21. The dimension of the grooves 29 is such as to receive the inner ends of a pair of flat adjustment links 30 and 31 having the outer ends respectively operatively connected to the upper ends of the shoes 14 and 15. With this arrangement, it will be apparent that the tubular member 21 is prevented from rotation by the adjustment links and that rotation of the screw 25 in one direction effects an axial movement of the member 21 inwardly. Inward movement of the member 21 causes the grooves 29 to cam the adjustment links outwardly and thereby diminishes the clearance between the friction lining 18 in the shoes and the brake flange 12. Accidental rotation of the screw 25 is prevented and predetermined increments of adjustment are indicated by the cooperating notches 23 and projections 24 previously described as respectively formed on the member 21 and screw 25.

Figure 2:
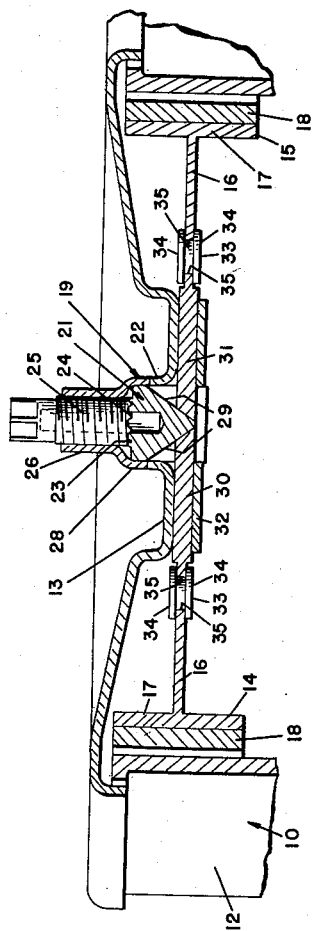
Figure 2 is a sectional view taken substantially on the plane indicated by the line 2—2 of Figure 1.
Figure 3:
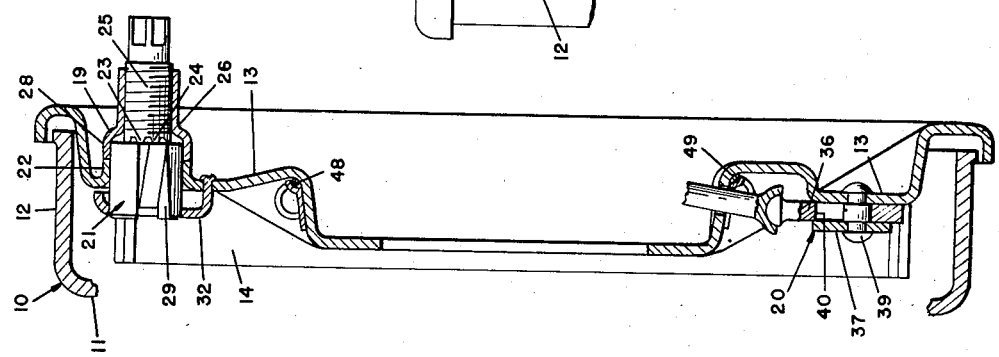
Figure 3 is a sectional view taken substantially on the plane indicated by the line 3—3 of Figure 1.

Upon reference to Figure 5, it will be noted that the adjustment links are flat in the plane of rotation of the drum and are guided throughout movement thereof between the backing plate 13 and a plate 32 secured to the backing plate in the manner shown in Figure 2. The outer ends of both the adjustment links and the adjacent ends of the web portions 16 of the brake shoes are maintained in alignment by means of pins 33 having heads 34 at opposite ends spaced from each other a sufficient distance to receive therebetween, the outer end portions of the adjustment links and the adjacent end portions of the webs 16 of the brake shoes. Attention is called to the fact that the outer ends of the adjustment links and adjacent portions of the webs of the brake shoes are formed with concave recesses 35 for fitting the stem of the pin between the head portions thereof. However, the outer ends of the adjustment links and the adjacent end portions of the brake shoes are spaced from each other to provide for relative angular movement of the ends of the shoes with respect to the links.

Upon reference to Figure 1, it will be noted that the adjustment links are inclined downwardly from the upper ends thereof with the result that the lateral force applied to the upper ends of the shoes by axial inward adjustment of the member 21 effects the application of angular force components to the shoes in the direction of the actuator 20. The angular force components effect a more uniform adjustment of the brake shoes with respect to the annular brake flange and thereby contributes materially to increasing the braking efficiency.

Figure 4:
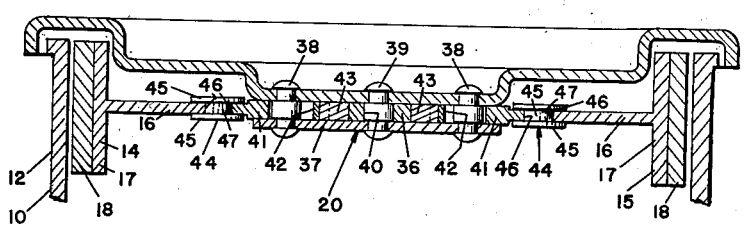
Figure 4 is a sectional view taken substantially on the plane indicated by the line 4—4 of Figure 1.

The actuator 20 is shown herein as comprising a radially movable wedge 36 supported for sliding movement between the backing plate 13 and a guide plate 37 secured to the backing plate in spaced relation thereto by means of the rivets 38. As shown in Figure 4, the center rivet 39 extends through an opening 40 in the wedge. The opening 40 is elongated in the direction of sliding movement of the wedge and increases in width toward the inner end thereof so as to permit lateral shifting movement of the shoes when the wedge is moved outwardly to expand the shoes into engagement with the brake flange. Movement is transferred from the wedge to the lower ends of the shoes by means of the actuating links 41 slotted as at 42 to receive the end rivets 38 and having the extreme inner ends fashioned to cooperate with rollers 43 upon outward movement of the wedge 36 to effect a corresponding movement of the links 41. The outer ends of the links 41 and the adjacent ends of the webs of the brake shoes are maintained in alignment by means of headed pins 44 identical to the pins 33 in that they are provided with heads 45 at opposite ends thereof spaced from each other a sufficient distance to receive therebetween, the adjacent ends of the actuator links and brake shoes. The lower ends of the brake shoes are identical to the upper ends thereof in that they are provided with concave recesses 46 adapted to fit the stems 47 of the pins 44 in the same manner as the upper ends of the shoes engage the stems 35 of the pins 33. The outer ends of the actuator links are similarly formed and are spaced from the ends of the shoes so as to permit a limited degree of angular displacement of the ends of the shoes with respect to the actuator links. In this connection, attention may be called to the fact that the two shoes are retracted from the brake flange and are maintained into frictional engagement with the pins 33 and 44 by means of two symmetrically arranged springs 48 and 49. The spring 48 is associated with the upper ends of the shoes while the spring 49 is connected to the lower ends of the shoes.

Referring again to Figure 1 of the drawings, attention is called to the fact that the links 41 are inclined upwardly from the lower ends thereof with the result that the force applied to the lower ends of the shoes through the links by the actuating wedge 36 produces angular force components in the direction of the anchor adjustment device 19. The application of angular force components in the aforesaid direction is desirable in that it provides for more uniformly engaging the friction surfaces of the shoes throughout the areas thereof with the adjacent surface of the annular brake flange and insures maximum breaking efficiency. In this connection, attention is further called to the fact that provision is made for shifting movement of the adjustment links 30 and 31 in a plane perpendicular to the axis of the brake drum. This movement is desirable with an actuator of the character previously set forth in that it permits the upper ends of the shoes to move into engagement with the brake flange under the influence of the angular force components produced by the actuator.

It will also be noted from the foregoing, that both shoes are identical in construction and are not only capable of being interchanged with each other from one side of the drum to the other, but are also interchangeable end for end. In other words, the primary shoe 15 of the brake shown herein may be interchanged with the secondary shoe 14 by merely rotating the shoes 180° from the position thereof shown and this is desirable not only because it simplifies assembly and reduces inventory, but also because it has the effect of appreciably increasing the life of the brake linings 18. In this connection, it is well known that the primary shoe wears at a considerably faster rate than the secondary shoe and consequently, interchanging these two shoes after a reasonable interval of service appreciably increases the usefulness of the linings. It will, of course, be understood that interchanging the primary shoe with the secondary shoe by, in effect, rotating the same throughout approximately 180° from the positions thereof shown in Figure 1, also provides for interchanging the ends of the shoes and this is desirable in that the ends at one side of the shoes usually wear to a greater extent than the opposite ends.

What I claim as my invention is:

1. In a brake mechanism, a brake drum having a brake flange, brake friction means within the drum engageable with the flange including shoes having the adjacent ends spaced from each other circumferentially of the drum substantially equal distances, an adjustment anchor device for the shoes located between the ends at one side of the drum and connected to the latter ends of the shoes, and an actuator supported between the opposite ends of the shoes and connected to the latter ends for moving the shoes into engagement with the brake flange, the ends of the shoes connected to the actuator being identical in construction to the ends of the shoes connected to the adjustment anchor device to permit interchanging the shoes end for end.

2. In a brake mechanism, a brake drum having a brake flange, friction means within the drum engageable with the flange including shoes interchangeable with each other from one side of the axis of the drum to the other and having the opposite adjacent ends spaced from each other circumferentially of the drum substantially equal distances, an anchor device located between the ends of the shoes at one side of the drum and connected to the latter ends, an actuator supported between the opposite ends of the shoes and engageable with the latter ends for moving the shoes into frictional engagement with the brake flange, the ends of the shoes connected to the actuator being identical in construction to the ends of the shoes connected to the anchor device permitting said shoes to be interchanged end for end.

3. In a brake mechanism, a brake drum, brake friction means engageable with the drum and including shoes having the adjacent ends spaced from each other circumferentially of the drum substantially equal distances, an adjustment device for the shoes located between the ends of the shoes at one side of the drum and operatively connected to the latter ends of the shoes, and an actuator supported between the opposite ends of the shoes and operatively connected to the latter ends for moving the shoes into engagement with the brake drum, the ends of the shoes operatively connected to the actuator being identical in construction to the ends of the shoes operatively connected to the adjustment device to permit interchanging the shoes end for end.

CHARLES A. SAWTELLE.